(12) United States Patent
Vera et al.

(10) Patent No.: US 8,627,506 B2
(45) Date of Patent: Jan. 7, 2014

(54) PROVIDING PRIVACY SETTINGS FOR APPLICATIONS ASSOCIATED WITH A USER PROFILE

(75) Inventors: Nico Vera, Palo Alto, CA (US); James Wang, Palo Alto, CA (US); Arieh Steinberg, Menlo Park, CA (US); Chris Kelly, Palo Alto, CA (US); Adam D'Angelo, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 778 days.

(21) Appl. No.: 12/154,886

(22) Filed: May 27, 2008

(65) Prior Publication Data

US 2009/0013413 A1   Jan. 8, 2009

Related U.S. Application Data

(60) Provisional application No. 60/931,851, filed on May 24, 2007.

(51) Int. Cl.
*G06F 21/00* (2013.01)

(52) U.S. Cl.
USPC .................................. 726/30; 726/26; 726/27

(58) Field of Classification Search
USPC ...................................................... 726/26–27
See application file for complete search history.

(56) References Cited

U.S. PATENT DOCUMENTS

| | | | |
|---|---|---|---|
| 5,937,413 A | 8/1999 | Hyun | |
| 5,987,440 A | 11/1999 | O'Neil et al. | |
| 6,029,141 A | 2/2000 | Bezos | |
| 6,269,369 B1 | 7/2001 | Robertson | |
| 6,871,231 B2 | 3/2005 | Morris | |
| 6,889,213 B1 | 5/2005 | Douvikas et al. | |
| 7,013,292 B1 | 3/2006 | Hsu | |
| 7,047,202 B2 | 5/2006 | Jaipuria et al. | |
| 7,246,164 B2 | 7/2007 | Lehmann et al. | |
| 7,249,123 B2 | 7/2007 | Elder | |
| 7,269,590 B2 | 9/2007 | Hull | |
| 7,353,199 B1 | 4/2008 | DiStefano | |
| 7,461,071 B2 | 12/2008 | Fitzpatrick et al. | |
| 7,966,647 B1 * | 6/2011 | Igoe et al. ......................... | 726/2 |
| 2001/0037721 A1 | 11/2001 | Hasegawa | |
| 2002/0059201 A1 * | 5/2002 | Work .............................. | 707/3 |

(Continued)

FOREIGN PATENT DOCUMENTS

| | | |
|---|---|---|
| JP | 2000-99458 | 4/2000 |
| JP | 2004-164599 | 6/2004 |

(Continued)

OTHER PUBLICATIONS

PCT International Search Report and Written Opinion, PCTUS/08/06703 dated Sep. 9, 2008, 9 pages.

(Continued)

*Primary Examiner* — Ghazal Shehni
(74) *Attorney, Agent, or Firm* — Fenwick & West LLP

(57) ABSTRACT

Systems and methods for providing privacy settings for applications associated with a user profile are provided. Exemplary methods include receiving a request from a member of a web-based social network to install an application in association with a member profile, installing the requested application, providing privacy settings selections to control access to data associated with the installed application, receiving a privacy settings selection from the member, and displaying data associated with the application based on the privacy settings selection.

13 Claims, 7 Drawing Sheets

(56) References Cited

U.S. PATENT DOCUMENTS

| | | |
|---|---|---|
| 2003/0145093 A1 | 7/2003 | Oren |
| 2003/0222918 A1 | 12/2003 | Coulthard |
| 2003/0225632 A1 | 12/2003 | Tong |
| 2004/0024846 A1 | 2/2004 | Randall |
| 2004/0088177 A1 | 5/2004 | Travis |
| 2004/0148275 A1 | 7/2004 | Achlioptas |
| 2005/0021750 A1 | 1/2005 | Abrams |
| 2005/0114759 A1 | 5/2005 | Williams |
| 2005/0154639 A1 | 7/2005 | Zetmeir |
| 2005/0159970 A1 | 7/2005 | Buyukkokten |
| 2005/0171799 A1 | 8/2005 | Hull |
| 2005/0171955 A1 | 8/2005 | Hull |
| 2005/0177385 A1 | 8/2005 | Hull |
| 2005/0197846 A1 | 9/2005 | Pezaris |
| 2005/0198020 A1 | 9/2005 | Garland |
| 2005/0198031 A1 | 9/2005 | Pezaris |
| 2005/0198299 A1* | 9/2005 | Beck et al. .................... 709/226 |
| 2005/0198305 A1 | 9/2005 | Pezaris |
| 2005/0203807 A1 | 9/2005 | Bezos |
| 2005/0216300 A1 | 9/2005 | Appelman |
| 2005/0216550 A1 | 9/2005 | Paseman |
| 2005/0235062 A1 | 10/2005 | Lunt |
| 2005/0256756 A1 | 11/2005 | Lam |
| 2006/0041543 A1 | 2/2006 | Achlioptas |
| 2006/0042483 A1 | 3/2006 | Work |
| 2006/0048059 A1 | 3/2006 | Etkin |
| 2006/0052091 A1 | 3/2006 | Onyon |
| 2006/0080613 A1 | 4/2006 | Savant |
| 2006/0085419 A1 | 4/2006 | Rosen |
| 2006/0136419 A1 | 6/2006 | Brydon |
| 2006/0136906 A1* | 6/2006 | Hughes et al. ................ 717/174 |
| 2006/0143068 A1* | 6/2006 | Calabria ......................... 705/10 |
| 2006/0143183 A1 | 6/2006 | Goldberg |
| 2006/0161599 A1 | 7/2006 | Rosen |
| 2006/0184617 A1 | 8/2006 | Nicholas |
| 2006/0190281 A1 | 8/2006 | Kott |
| 2006/0194186 A1 | 8/2006 | Nanda |
| 2006/0218225 A1 | 9/2006 | Hee Voon |
| 2006/0229063 A1 | 10/2006 | Koch |
| 2006/0230061 A1 | 10/2006 | Sample |
| 2006/0242581 A1 | 10/2006 | Manion et al. |
| 2006/0247940 A1 | 11/2006 | Zhu |
| 2006/0248573 A1 | 11/2006 | Pannu |
| 2006/0256008 A1 | 11/2006 | Rosenberg |
| 2006/0265227 A1 | 11/2006 | Sadamura |
| 2006/0293976 A1 | 12/2006 | Nam |
| 2007/0174389 A1 | 7/2007 | Armstrong |
| 2007/0208916 A1 | 9/2007 | Tomita |
| 2007/0282987 A1 | 12/2007 | Fischer |
| 2008/0005076 A1 | 1/2008 | Payne |
| 2008/0010343 A1 | 1/2008 | Escaffi |
| 2008/0033776 A1 | 2/2008 | Marchese |
| 2008/0040428 A1 | 2/2008 | Wei |
| 2008/0070697 A1 | 3/2008 | Robinson |
| 2008/0086458 A1 | 4/2008 | Robinson |
| 2008/0127318 A1* | 5/2008 | Adler ............................... 726/7 |

FOREIGN PATENT DOCUMENTS

| | | |
|---|---|---|
| JP | 2005-122751 | 5/2005 |
| JP | 2007-287131 | 11/2007 |
| JP | 2008-527856 | 7/2008 |
| JP | 2008-537257 | 9/2008 |
| WO | WO 2006/074304 | 7/2006 |
| WO | WO 2006/115524 | 11/2006 |

OTHER PUBLICATIONS

U.S. Appl. No. 11/639,655, Mark Zuckerberg, Systems and Methods for Social Mapping, filed Dec. 14, 2006.

U.S. Appl. No. 11/646,206, Aaron Sittig, Systems and Methods for Generating a Social Timeline, filed Dec. 26, 2006.

U.S. Appl. No. 11/493,291, Mark Zuckerberg, Systems and Methods for Dynamically Generating a Privacy Summary, filed Jul. 25, 2006.

U.S. Appl. No. 11/701,698, Jed Stremel, System and Method for Digital File Distribution, filed Feb. 2, 2007.

U.S. Appl. No. 11/713,455, Jed Stremel, Systems and Methods for Automatically Locating Web-Based Social Network Members, filed Feb. 28, 2007.

U.S. Appl. No. 11/701,566, Jed Stremel, System and Method for Automatic Population of a Contact File with Contact Content and Expression Content, filed Feb. 2, 2007.

U.S. Appl. No. 11/502,757, Andrew Bosworth, Systems and Methods for Generating Dynamic Relationship-Based Content Personalized for Members of a Web-Based Social Network, filed Aug. 11, 2006.

U.S. Appl. No. 11/503,093, Andrew Bosworth, Systems and Methods for Measuring User Affinity in a Social Network Environment, filed Aug. 11, 2006.

U.S. Appl. No. 11/503,037, Mark Zuckerberg, Systems and Methods for Providing Dynamically Selected Media Content to a User of an Electronic Device in a Social Network Environment, filed Aug. 11, 2006.

U.S. Appl. No. 11/503,242, Mark Zuckerberg, System and Method for Dynamically Providing a News Feed About a User of a Social Network, filed Aug. 11, 2006.

U.S. Appl. No. 11/499,093, Mark Zuckerberg, Systems and Methods for Dynamically Generating Segmented Community Flyers, filed Aug. 2, 2006.

U.S. Appl. No. 11/580,210, Mark Zuckerberg, System and Method for Tagging Digital Media, filed Oct. 11, 2006.

U.S. Appl. No. 11/893,493, Arieh Steinberg, Web-Based Social Network Badges, filed Aug. 15, 2007.

U.S. Appl. No. 11/982,974, Ruchi Sanghvi, Systems and Methods for a Web-Based Social Networking Environment Integrated Within One or More Computing and/or Networking Applications, filed Nov. 5, 2007.

U.S. Appl. No. 11/701,595, Ezra Callahan, System and Method for Determining a Trust Level in a Social Network Environment, filed Feb. 2, 2007.

U.S. Appl. No. 11/726,962, Charlie Cheever, System and Method for Confirming an Association in a Web-Based Social Network, filed Mar. 23, 2007.

U.S. Appl. No. 11/701,744, Andrew Bosworth, System and Method for Curtailing Objectionable Behavior in a Web-Based Social Network, filed Feb. 2, 2007.

U.S. Appl. No. 11/796,184, Jared S. Morgenstern, System and Method for Giving Gifts and Displaying Assets in a Social Network Environment, filed Apr. 27, 2007.

U.S. Appl. No. 11/893,797, Yun-Fang Juan, System and Method for Invitation Targeting in a Web-Based Social Network, filed Aug. 16, 2007.

U.S. Appl. No. 11/893,820, Yun-Fang Juan, Systems and Methods for Keyword Selection in a Web-Based Social Network, filed Aug. 16, 2007.

U.S. Appl. No. 11/899,426, Jared Morgenstern, System and Method for Collectively Giving Gifts in a Social Network Environment, filed Sep. 5, 2007.

U.S. Appl. No. 12/072,003, Arieh Steinberg, Systems and Methods for Implementation of a Structured Query Language Interface in a Distributed Database Environment, filed Feb. 21, 2008.

U.S. Appl. No. 12/077,070, Dave Fetterman, Systems and Methods for Network Authentication, filed Mar. 13, 2008.

U.S. Appl. No. 12/154,504, Adam D'Angelo, Personalized Platform for Accessing Internet Applications, filed May 23, 2008.

U.S. Appl. No. 12/156,091, Mark Zuckerberg, Systems and Methods for Auction Based Polling, filed May 28, 2008.

U.S. Appl. No. 12/151 734, Jared Morgenstern, System and Methods for Classified Advertising in an Authenticated Web-Based Social Network, filed May 7, 2008.

U.S. Appl. No. 11/893,559, Adam D'Angelo, Platform for Providing a Social Context to Software Applications, filed Aug. 15, 2007.

U.S. Appl. No. 12/080,808, Peter Deng, Systems and Methods for Calendaring, filed Apr. 2, 2008.

Flores, Fernando et al. "Computer systems and the design of organizational interaction." In ACM Transactions on Information Systems (TOIS), vol. 6, Issue 2, Apr. 1988.

(56) References Cited

OTHER PUBLICATIONS

Chipin. Chipin: The easy way to collect money [online], Dec. 15, 2006 http://web.archive.org/web/20061215090739/www.chipin.com/overview.

Parzek, E Social Networking to Chipin to a Good Cause [online]. Business Design Studio, Jun. 29, 2006 http://www.businessdesignstudio.com/resources/blogger/2006/06social-networking-tochipin-to-good.html.

Chinese State Intellectual Property Office, First Office Action, Chinese Application No. 2008-80017190.0, Feb. 23, 2011.

European Patent Office, Supplementary Search Report, European Patent Application No. EP 08767886.8, Jun. 29, 2011, four pages.

The State Intellectual Property Office of the People's Republic of China, Notification of Third Office Action, Chinese Patent Application No. 200880017190.0, Oct. 9, 2012, 11 Pages.

Australian Patent Office, Examiner's First Report, Australian Patent Application No. 2008257165, Jan. 25, 2012, two pages.

PCT International Preliminary Report on Patentability, PCT Application No. PCT/US2008/006703, Nov. 24, 2009, five pages.

Chinese State Intellectual Property Office, Second Office Action, Chinese Application No. 200880017190.0, Apr. 11, 2012, eleven pages.

Japanese Patent Office, Notice of Grounds for Rejection, Japanese Patent Application No. P2010-509410, Jun. 5, 2012, 6 pages.

Canadian Intellectual Property Office, Requisition by the Examiner, Canadian Patent Application No. 2,687,089, Aug. 7, 2012, 3 pages.

State Intellectual Property Office of the People's Republic of China, Fourth Office Action, Chinese Patent Application No. 200880017190.0, Feb. 18, 2013, fourteen pages.

State Intellectual Property Office of the People's Republic of China, Office Action, Chinese Patent Application No. 200880017190.0, Aug. 21, 2013, fourteen pages.

\* cited by examiner

PROVIDING PRIVACY SETTINGS FOR APPLICATIONS ASSOCIATED WITH A USER PROFILE

CROSS-REFERENCE TO RELATED APPLICATIONS

The present application claims the benefit and priority of U.S. Provisional Patent Application Ser. No. 60/931,851 filed on May 24, 2007, titled "Systems and Methods for Providing Privacy Settings for Applications Associated with a User Profile," which is hereby incorporated by reference.

BACKGROUND

1. Field of the Invention

The present invention relates generally to social networks, and more particularly to systems and methods for providing privacy settings for applications associated with a user profile.

2. Description of Related Art

Conventionally, web-based social networks provide privacy settings to allow a member of the social network to control what other people (i.e. other members, non-members and/or computer users) may access and/or view about that member. For example, a social network member may only want people that attend school with the member to view information about that member. Typically, the privacy settings are provided in association with a member profile on the social network. The member profile may include detailed information about the member of the social network. A problem with conventional privacy settings, however, is that the privacy settings do not control data generated by various computing applications in response to member input. Additionally, conventional privacy settings fail to address the needs required by each member based on the type of computing application utilized by the member. Consequently, there is a need for systems and methods for providing privacy settings for applications associated with a user profile.

SUMMARY

Systems and methods for providing privacy settings for applications associated with a user profile are provided. Exemplary methods include receiving a request from a member of a web-based social network to install an application in association with a member profile, installing the requested application, providing privacy settings selections to control access to data associated with the installed application, receiving a privacy settings selection from the member, and displaying data associated with the application based on the privacy settings selection.

Exemplary systems include a communications interface configured to receive a request from a member of a web-based social network to install an application in association with a member profile, a profile module configured for installation of the requested application, a privacy settings module configured to provide a privacy settings selection to the member to control access to data associated with the installed application and to receive a privacy settings selection from the member, and the communications interface further configured to send data associated with the application for display based on the privacy settings selection.

DETAILED DESCRIPTION

Systems and methods for providing privacy settings for applications associated with a web-based social network member profile are provided. When a member of a web-based social network installs a computing application (or otherwise allows access to a computing application) that interacts with or integrates data associated with the social network, privacy settings selections are provided for the member to control access and/or viewing by other members of the social network. The computing applications may be made available via a product directory. The product directory may provide computing applications for installation internally through a member's profile. The product directory may also provide computing applications for installation externally, or through sites associated with the computing applications, separate from the social network. Privacy setting selections for the applications installed internally may be made by a member or privacy settings selections for external applications may be made under the terms of service to which the member assents in order to install the external applications. The data associated with the applications may be displayed to one or more second members based on the privacy settings selections.

Figure 1:
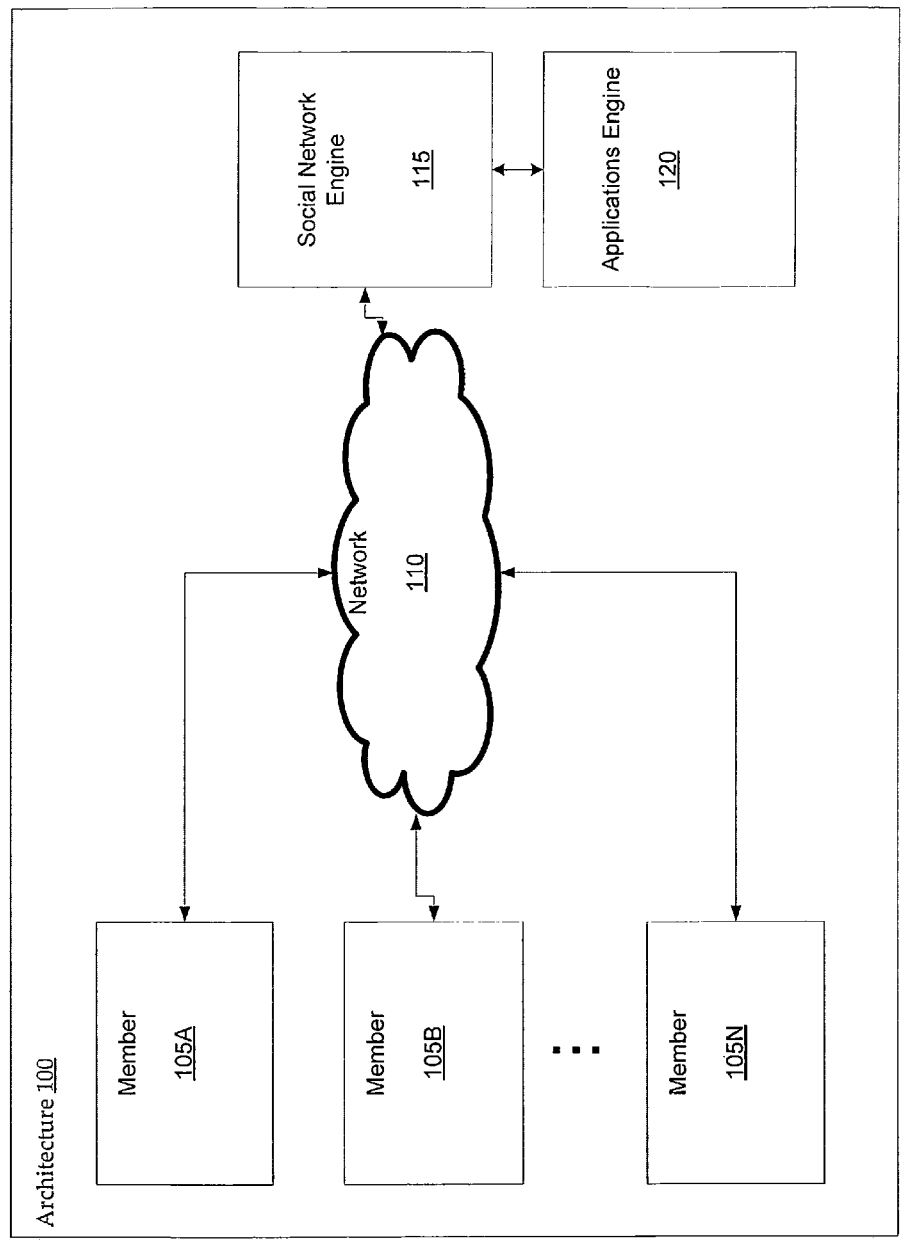
FIG. 1 is a block diagram of an exemplary web-based social network architecture.

FIG. 1 is a block diagram of an exemplary web-based social network architecture. The exemplary architecture 100 comprises users or member 105A through member 105N of a web-based social network, (generically referred to as member 105N or members 105N), a network 110, a social network engine 115, and an applications engine 120. The social network engine 115 and/or the applications engine 120 may be comprised of instructions that may be stored on a computer-readable storage medium. The instructions may be retrieved and executed by a processor. Some examples of instructions are software, program code, and firmware. Some examples of storage medium are memory devices, tape, disks, integrated circuits, and servers.

According to one exemplary embodiment, one or more members 105N communicate via the network 110 to the social network engine 115. The network 110 may comprise any electronic wired, wireless and/or mobile network, including the Internet. The members 105N are typically members of a social networking website and the social networking website may be associated with the social network engine 115 and/or the applications engine 120. Each of the members 105N may have a profile, profile page, or the like in a profile database that may be stored on a server in communication with the social network engine 115 and/or the applications engine 120. The profile may include information about the respective member 105N, such as name, address, interests, political and religious views, affiliations (e.g. school, geographic community, and/or employer), pictures, friends, and so forth. The members 105N may access or interact with the social network via a computing device, such as a laptop or desktop computer, a cellular telephone, a personal digital assistant (PDA), a set top box, and so forth. The members 105N may view and/or access data about other social network members (in addition to themselves) or interact with the other social network members via the social network engine 115, by entering data about themselves (e.g. into their respective personal profiles) or by joining social network groups, and so forth.

The applications engine 120, according to various exemplary embodiments, may provide one or more computing applications for installation on, in association with, and/or accessing from a member's profile. An application may be accessed via a link pasted to the member profile, or via an application installed within the member profile. Applications installed from within the member profile may comprise profile applications or platform applications. The applications may be developed by third party entities outside of the social network ("third-party applications"), by the social network, and/or by members of the social network.

According to one exemplary embodiment, a member 105N might install a movie related application on their profile. The movie related application might be provided by an online company that ships movie rentals to its customers. The application may be made available to the member for installation via an application programming interface ("API"). For example, the member may access the application from the social network via the API by pasting or clicking a link to the application within their profile, or by using a similar mechanism that allows a shortcut to the application. Following installation of the movie related application, data about the movie related application might be displayed on or near the member's profile. Data about the movie related application might be displayed elsewhere, such as on the member's computer desktop. The movie related application may be able to access and incorporate data from the member's profile page (e.g. the member's interests, education, hobbies, etc) in order to make movie rental recommendations for the member. Such information may be displayed to the member and to whoever else the member may allow to access and view the information via the privacy settings selections described herein.

The applications engine 120, in accordance with the social network engine 115, according to various embodiments, may provide privacy settings selections related to the display of data about a chosen application, such as the movie related application on the member profile as described herein. Thus, via the applications engine 120, the member might select other members that may view data about the movie related application on the member's profile. For example, the member may determine those other members that may view the member's most recent movie rentals.

Figure 2:
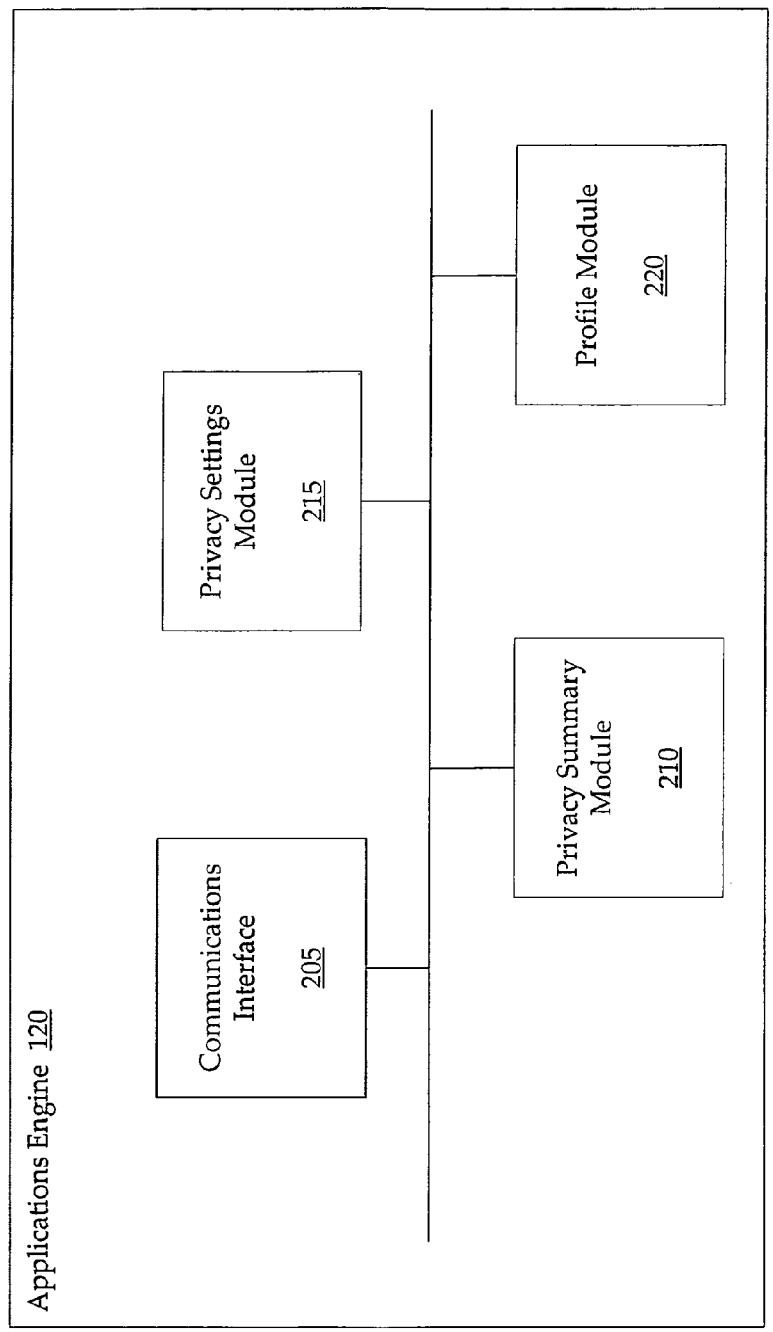
FIG. 2 is a block diagram of an exemplary applications engine associated with a social network environment.

Referring now to FIG. 2, a block diagram of an exemplary applications engine associated with a social network environment is illustrated. The exemplary applications engine 120 comprises a communications interface 205, a privacy summary module 210, a privacy settings module 215, and a profile module 220.

According to one exemplary embodiment, the communications interface 205 may be provided for communicating data between the social network engine 115 (FIG. 1) and applications installed on a profile of a member of a social network. For example, a member's selection of a recommended movie displayed by a movie related application on the member's profile may comprise data exchanged between the social network engine 115 and the application via the communications interface 205.

The privacy settings module 215, in various exemplary embodiments, may be configured for allowing a member to select various privacy settings selections related to an application. For example, the member may limit the display of the application on the member's profile to those members of the social network that the member has designated as the friends of the member. The privacy settings module 215 may provide most any type of selections for privacy settings associated with the display of data associated with an application.

In one exemplary embodiment, the privacy summary module 210 may generate a privacy summary, such as an explanatory paragraph, of the privacy settings selections made by a member with respect to applications installed and/or accessed by the member.

The profile module 220, according to one embodiment, may be configured to direct storage of a member's privacy settings selections. For example, the privacy summary module 210 may utilize data from the profile module 220 to generate the privacy summary discussed herein. Most any type of data may be generated and/or stored by the profile module 220. Further, most any type of data about a member may be accessed via the profile module 220. The profile module 220 may control access to data about the member in accordance with the privacy settings module 215. In other words, the profile module 220 may display data about applications installed on a member's profile to only those members selected by the member as indicated by the privacy settings module 215.

Although FIG. 2 shows various modules in association with the applications engine 120, fewer or more modules may be provided and still fall within the scope of various embodiments.

Figure 3:
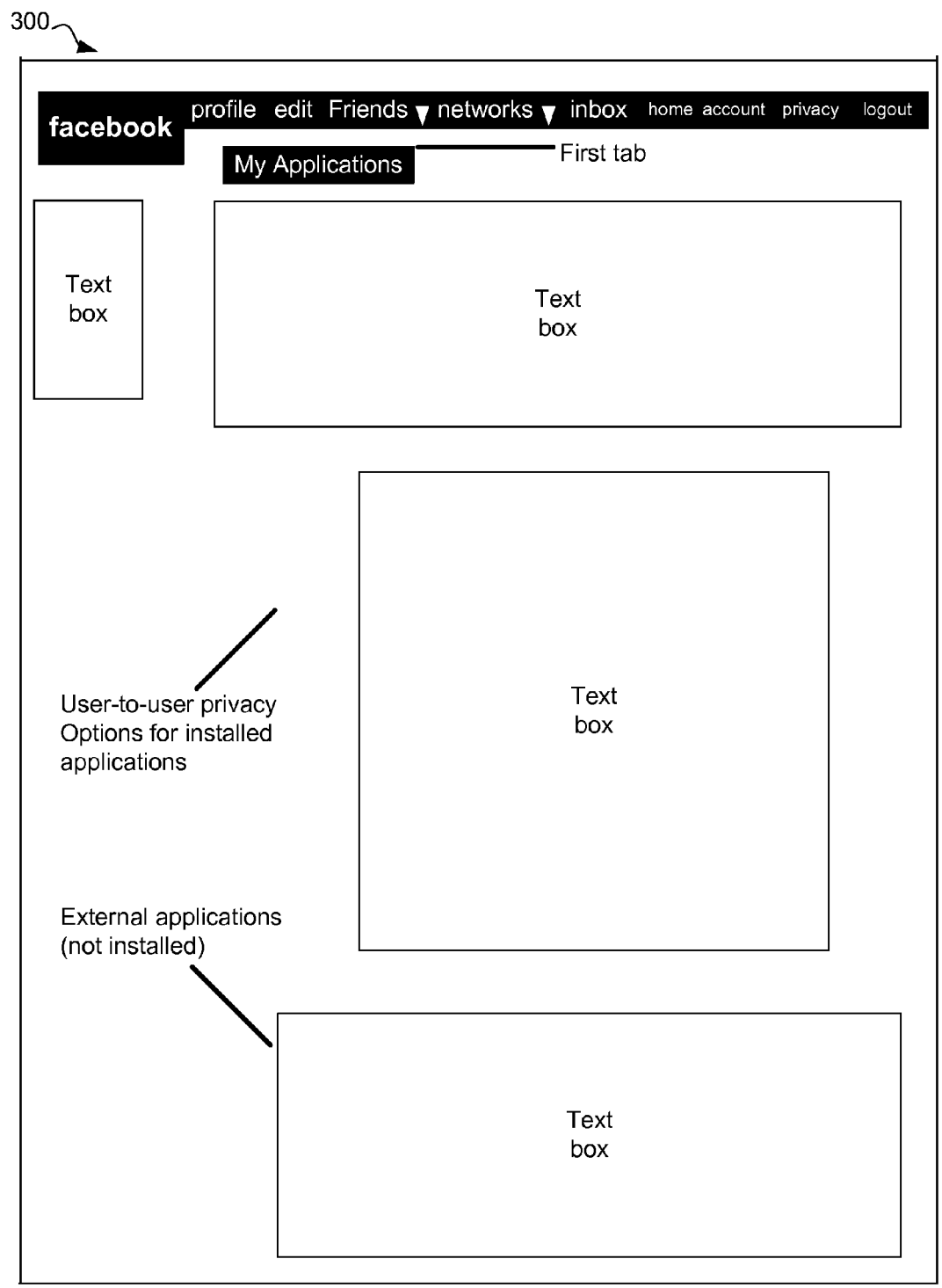
FIG. 3 is a screenshot of exemplary privacy settings selections associated with a profile application.

FIG. 3 is a screenshot of exemplary privacy settings selections associated with a profile application. As shown by the exemplary privacy settings selections in screenshot 300, for each profile application, a member may select various privacy settings selections. According to one exemplary embodiment, each of the privacy settings selections for a profile application may allow a particular member to determine which of the other members and/or groups of members (e.g. networks) may view and/or access data about the profile application via a profile associated with the particular member. For example, as shown in screenshot 300, the member has selected "Microsoft" and "Silicon Valley, Calif." networks as the networks that may view and/or access the "Chumby" application installed on the member's profile. Thus, the "Microsoft" and "Silicon Valley, Calif." networks and "all my friends" may see data associated with the "Chumby" application. Likewise, the exemplary privacy settings selections in screenshot 300 show for a book review application installed by a member, the member has determined that "all my networks and all my friends" may access and/or view data displayed about the book review application.

According to various exemplary embodiments, when "some of my" is selected from a drop down menu for a particular application, a further list may allow a member to select further privacy settings selections for which networks, friends, and so forth may view data related to the particular application. Additionally, screenshot 300 shows that the member has selected "only my friends" view data about the "U.S. Politics" application. Thus, if the "U.S. Politics" application indicates the member's party affiliation, only the member's "friends" grouping may view the member's party affiliation and any other data indicated by the application on the member's profile.

Screenshot 300 also shows a list of external applications. In one embodiment, a "logged in" status indicates to a member which applications the member is presently logged into. An option to remove each of the external applications is also provided. The external applications may represent applications installed outside of a member's profile wherein with the member may have assented to the terms of service associated with the external applications, such as the sharing or use of the member's data from within the social network. In order to revoke permissions to access the member's data, the member may need to remove the particular external application. It may also be possible to install the same external application as a profile application, where the member may control the data other members may see about the application on the member's profile.

According to a further embodiment, a scaled representation of privacy settings selections for an application may be displayed. As shown in screenshot 300, a "U.S. Politics" application is accompanied by a relatively short line representation (shown to the right of the text descriptions of the privacy settings selections in screenshot 300) when compared to the line representation for the "My Space" application because fewer members are selected to access data related to the "U.S. Politics" application in the member's profile. Although line representations are shown in screenshot 300, any scaled representation may be provided according to some embodiments, such as a shaded bubble.

Figure 4:
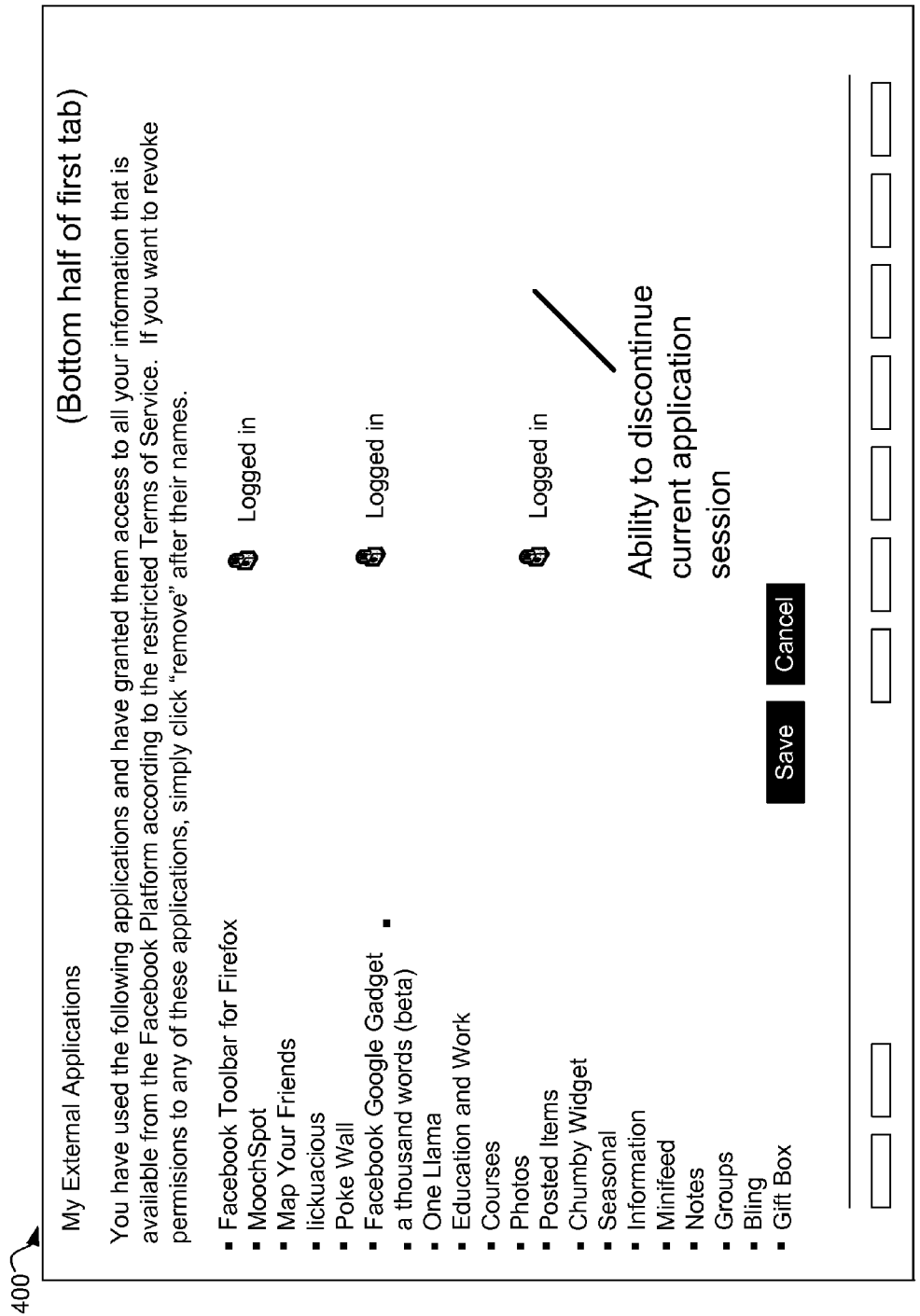
FIG. 4 is a screenshot of exemplary permissions associated with external applications.

FIG. 4 is a screenshot of exemplary permissions associated with external applications. The exemplary permissions shown in screenshot 400 are also shown on the bottom half of screenshot 300 (FIG. 3) showing exemplary privacy settings selections. According to various embodiments, access to data about members associated with a social network may be granted via terms of service with a third party (external) application that a member may install from outside of the social network. The external application may utilize some or all of the member's data. Further, the external application may be located on or associated with a website located out of the social network. The member may discontinue a session with the external application by logging out, as indicated by the "click here to log out" selection as shown in screenshot 400.

Figure 5:
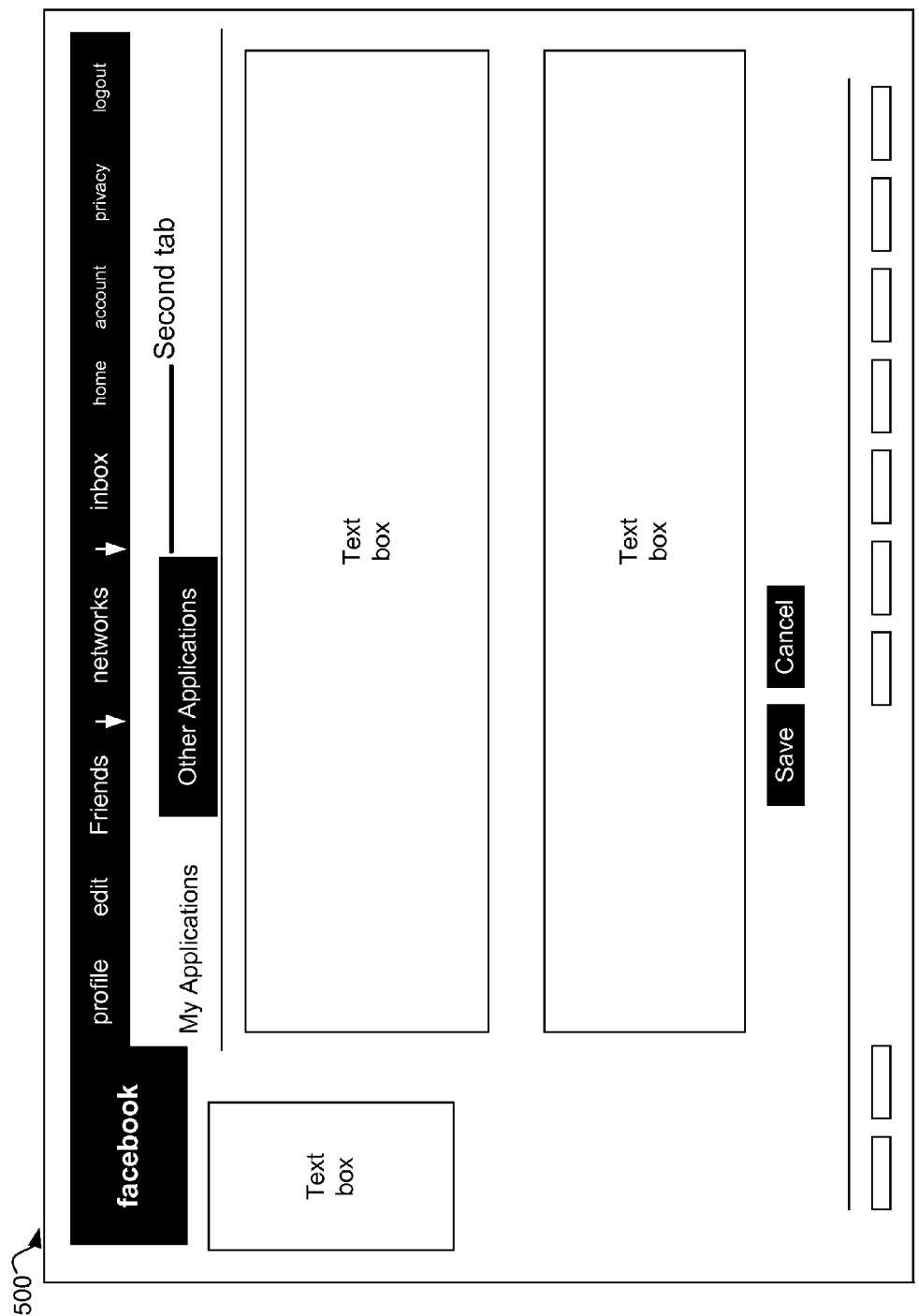
FIG. 5 is a screenshot of exemplary privacy settings selections for other applications.

FIG. 5 is a screenshot of exemplary privacy settings selections for other applications. In various embodiments, the exemplary privacy settings selections for other applications as shown in screenshot 500 may determine what data other applications may access about a member when those applications are installed and/or operated by the member's "friends". In other words, if a second member belongs to the "friends" grouping of a first member, applications installed by the second member may access data, such as profile data, about the first member unless the first member makes privacy settings selections indicating that no data should be shared with the applications installed by the second member. Such privacy settings selections may be made by the first member unchecking all of the items shown in screenshot 500 or by any other method. The first member may specify which data associated with their profile may be shared by checking specific boxes. Although various boxes representing profile data are shown in screenshot 500, such as "groups you belong to", fewer or more boxes may be provided to represent more or less profile data associated with each member and still fall within the scope of the various embodiments contemplated herein.

As shown in screenshot 500, according to one embodiment, the member may "check all" of the boxes, "uncheck all" of the boxes, or "restore defaults" by making a selection at the bottom of screenshot 500 and then selecting "save" or "cancel" to confirm or deny the selections. By checking one or more of the boxes representing profile data associated with the member, the member consents to sharing the member's names, networks, and list of friends with the profile applications discussed herein.

Further, as shown in FIGS. 3 through 5, the privacy settings selections for profile or platform applications, the external applications, and/or the other applications may be accessed by selecting one or more tabs associated with each of the application categories.

Figure 6:
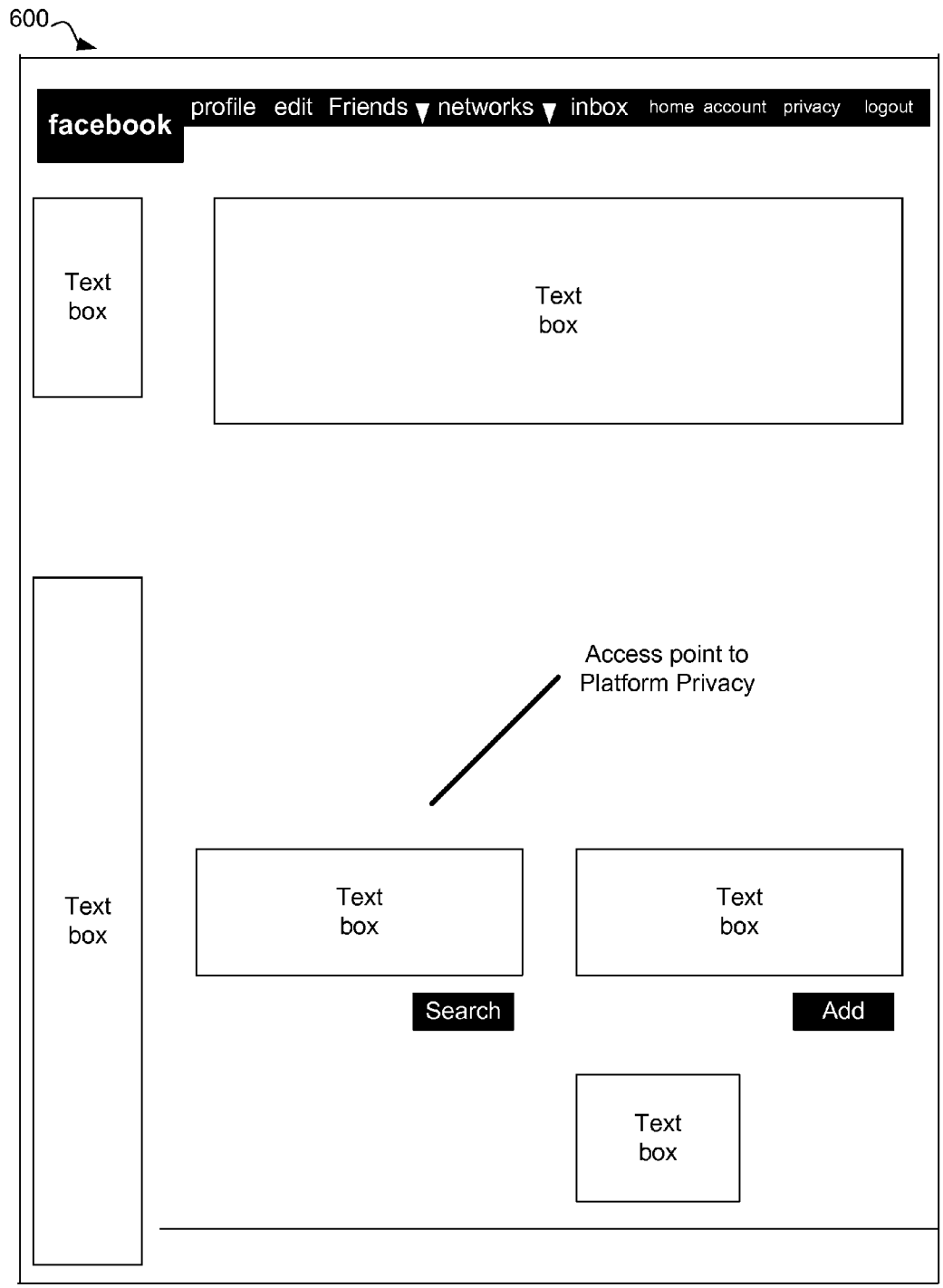
FIG. 6 is a screenshot of an exemplary privacy overview.

FIG. 6 is a screenshot of an exemplary privacy overview. In various exemplary embodiments, the exemplary privacy overview shown in screenshot 600 provides a summary of settings that may be edited for various categories associated with each member, such as "Profile", "Search", "Photos", and "Facebook Platform." For example, the "Facebook Platform" category may be accessed to select the privacy settings selections for the applications discussed herein, such as to determine what information other members may access and/or view about applications installed on a particular member's profile.

As shown in screenshot 600, options to block certain other members and/or to limit access to a member's profile may be accessed via the privacy overview screen, in some embodiments. An "edit settings" option is provided on the privacy overview screen for accessing the category with which privacy settings may be edited, such as the "Facebook Platform" from which applications may be installed.

Figure 7:
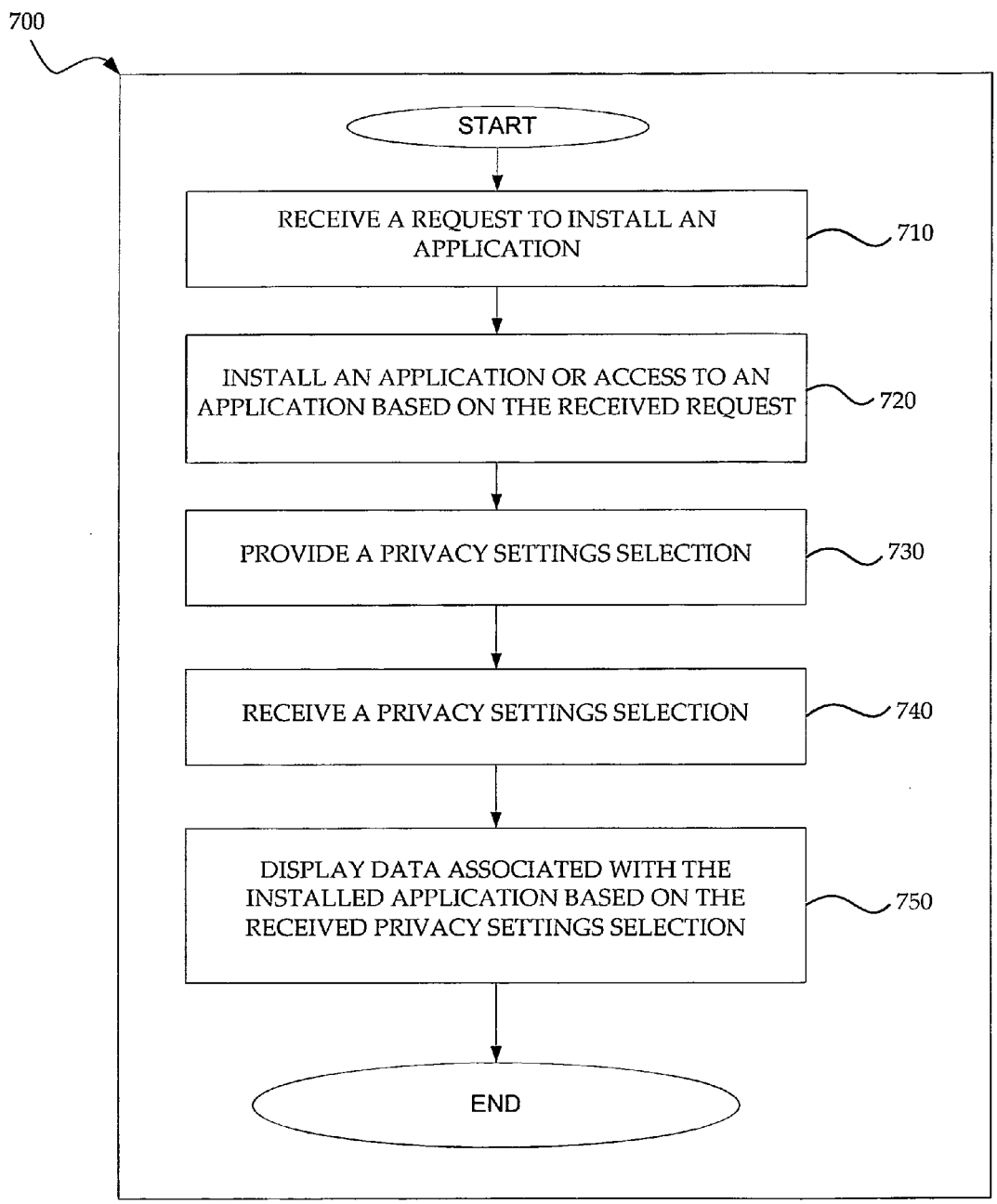
FIG. 7 is a flow chart of an exemplary process for providing privacy settings selections for applications associated with a member profile.

FIG. 7 is a flow chart of an exemplary process 700 for providing privacy settings selections for applications associated with a member profile.

At step 710, a request from a member to install an application in association with a member profile is received. According to one exemplary embodiment, a social network engine such as the exemplary social network engine 115 (FIG. 1) may receive a request from a member such as member 105A (FIG. 1) to install an application (or to access to an application). The request may represent a request for a profile application or a platform application.

At step 720, an application or access to an application may be installed in response to the received request. As discussed herein, installing a profile application generates a box or other display on the requesting member's profile. For example, installing a stock market application may generate a stock market display box on the member's profile page. Alternatively, if the member installs the stock market application directly from the stock market application provider, rather than via the social network engine 115, a display box with the stock market application data may not be displayed on the member's profile. For example, the member may access an external application by installing the external application on a computing device associated with the member and assenting to terms of service from the social network so that the social network may share certain member data with the external application.

At step 730, a privacy settings selection to control access to data associated with the installed application may be provided. For example, the privacy settings selections for the stock market application may be provided to the member who installed the application in order for the member to determine which of the member's networks may access and/or view related data from the member's profile page, such as suggested stock purchases provided to the member by the stock market application.

At step 740, one or more privacy settings selections are received from a member. In one exemplary embodiment, a member submits a privacy settings selection for a particular application. Screenshot 300 (FIG. 3) shows the various exemplary privacy settings selections that may be received for various applications, such as the "Chumby" and "University Ave. Restaurants" applications. Any number of privacy settings selections for any number of applications may be received from a member.

At step 750, data associated with the installed application may be displayed based on the received privacy settings selection. For example, the data related to the stock market application may be displayed to all of a member's friends based on the member making the privacy settings selection of "all my friends" for the stock market application.

While various embodiments have been described above, it should be understood that they have been presented by way of example only, and not limitation. For example, any of the elements associated with the applications engine 120 (FIG. 1) may employ any of the desired functionality set forth herein. Thus, the breadth and scope of a preferred embodiment should not be limited by any of the above-described exemplary embodiments. Further, as these embodiments are described with reference to illustrations, various modifications or adaptations of the methods and/or specific structures described may become apparent to those skilled in the art. The herein-described components and functions can be comprised of instructions that are stored on a computer-readable storage medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with the invention. Those skilled in the art are familiar with instructions, processor(s), and storage medium.

What is claimed is:

1. A method comprising:
maintaining a user profile for a user of a social networking system, the user profile including profile information about the user and information about one or more connections of the user in the social networking system;
maintaining privacy settings for the user for controlling access by other users in the social networking system to data sharable by a third party application used by the user, the third party application maintained by an entity distinct from the social networking system;
receiving from the third party application a request for information about the user;
determining by a processor device whether the privacy settings for the user allow a second user of the social networking system access to the data associated with the third party application, the request for information about the user responsive to use of the third party application by the second user; and
communicating the privacy settings for the user to the third party application to allow the requested information about the user to be provided to the second user in conjunction with use of the third party application by the second user, if the privacy settings for the user allow the second user access to the data associated with the third party application.

2. The method of claim 1, wherein the third party application is available via a product directory.

3. The method of claim 1, the method further comprising providing for display a summary of the privacy settings.

4. A system, comprising:
a memory;
profile instructions stored on the memory configured to maintain a user profile for a user of a social networking system, the user profile including profile information about the user and information about one or more connections of the user in the social networking system;
privacy settings instructions stored on the memory configured for controlling access by other users in the social networking system to data sharable by a third party application used by the user, the access to the information about the user and the information about connections of the user, wherein the third party application is maintained by an entity distinct from the social networking system;
a communications interface configured to receive from the third party application a request for information about the user, wherein the request is responsive to use of the third party application by a second user who is connected to the user in the social networking system;
the privacy settings instructions further configured to determine whether the privacy settings for the user allow the second user access to the data associated with the third party application; and
the communications interface further configured to communicate the privacy settings for the user to the third party application to allow the requested information about the user to be provided to the second user in conjunction with use of the third party application by the second user, if the privacy settings for the user allow the second user access to the data associated with the third party application.

5. The system of claim 4, wherein the third party application is available via a product directory.

6. The system of claim 4, the system further comprising a privacy summary module configured to provide for display a summary of the privacy settings.

7. A non-transitory computer readable medium storing one or more programs, the one or more programs comprising instructions which when executed by a processor, cause the processor to perform a method comprising:
maintaining a user profile for a user of a social networking system, the user profile including profile information about the user and information about one or more connections of the user in the social networking system;
maintaining privacy settings for the user for controlling access by other users in the social networking system to data sharable by a third party application used by the user, the third party application maintained by an entity distinct from the social networking system;
receiving from the third party application a request for information about the user;
determining by the processor whether the privacy settings for the user allow a second user of the social networking system access to the data associated with the third party application, the request for information about the user responsive to use of the third party application by the second user; and
communicating the privacy settings for the user to the third party application to allow the requested information about the user to be provided to the second user in conjunction with use of the third party application by the second user, if the privacy settings for the user allow the second user access to the data associated with the third party application.

8. The non-transitory computer readable medium of claim 7, wherein the third party application is available via a product directory.

9. The non-transitory computer readable medium of claim 7, the method further comprising providing for display a summary of the privacy settings.

10. The non-transitory computer readable medium of claim 7, wherein the privacy settings allow information about the user associated with the third party application to be accessed by a school network of the user.

11. The non-transitory computer readable medium of claim 7, wherein the privacy settings allow information about the user associated with the third party application to be accessed by a workplace network of the user.

12. The non-transitory computer readable medium of claim 7, wherein the privacy settings allow information about the user associated with the third party application to be accessed by a geographic network of the user.

13. A method comprising:
maintaining a user profile of a user of a social networking system, the user profile including information about the user and information about one or more connections of the user;
maintaining privacy settings for the user for controlling access by other users in the social networking system to data sharable by a third party application used by the user, the third party application maintained by an entity distinct from the social networking system;
receiving from the third party application a request for information about the user and information about connections of the user, wherein the third party application is configured to share the requested information about the user with one or more other users who are connected to the user in the social networking system;
determining by a processor device whether the privacy settings for the user allow a second user of the social networking system access to the data associated with the third party application, the request for information about the user responsive to use of the third party application by the second user; and
communicating the privacy settings for the user to the third party application to allow the requested information about the user and the requested information about connections of the user to be provided to the second user in conjunction with use of the third party application by the second user, if the privacy settings for the user allow the second user access to the data associated with the third party application.

\* \* \* \* \*